(12) United States Patent
Wieland (10) Patent No.: US 9,292,455 B1
(45) Date of Patent: *Mar. 22, 2016

(54) INTERCONNECTION OF PERIPHERAL DEVICES ON DIFFERENT ELECTRONIC DEVICES

(71) Applicant: Open Invention Network LLC, Durham, NC (US)

(72) Inventor: Martin Wieland, Munich (DE)

(73) Assignee: Open Invention Network, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/859,634

(22) Filed: Sep. 21, 2015

Related U.S. Application Data

(63) Continuation of application No. 12/850,045, filed on Aug. 4, 2010, now Pat. No. 9,141,564.

(51) Int. Cl.
*G06F 13/12* (2006.01)
*G06F 13/10* (2006.01)
*G06F 9/44* (2006.01)
*G06F 13/40* (2006.01)

(52) U.S. Cl.
CPC ............ *G06F 13/105* (2013.01); *G06F 9/4416* (2013.01); *G06F 13/4045* (2013.01)

(58) Field of Classification Search
CPC .... G06F 13/105; G06F 9/4416; G06F 1/3209

USPC .......................................................... 710/64
See application file for complete search history.

(56) References Cited

U.S. PATENT DOCUMENTS 8,028,040 B1 *  9/2011  Hobbs ................ G06F 9/45558
                                                    370/389
2009/0222592 A1 *  9/2009  Anderson .......... H04N 1/32545
                                                     710/8

* cited by examiner

*Primary Examiner* — Ernest Unelus
(74) *Attorney, Agent, or Firm* — Haynes and Boone, LLP (57) ABSTRACT

A peripheral device connected to a local electronic device which is connected to at least one communication network can communicate with a peripheral device attached to a remote electronic device as if the remote peripheral device was locally attached. Data designated for the remote peripheral device is received by a local virtual device object and transmitted to the remote electronic device via at least one of the electronic devices communication interfaces or peripheral devices. Data received by the remote electronic device's communication interface or peripheral device is written to the peripheral device at the remote electronic device by a virtual device object. For compensation of different transfer speeds or outages between the peripheral device and the communication interface or another peripheral device the virtual device provides the ability to utilize the virtual devices emulation driver that is attached to the virtual device object as an I/O buffer.

20 Claims, 5 Drawing Sheets

INTERCONNECTION OF PERIPHERAL DEVICES ON DIFFERENT ELECTRONIC DEVICES

CROSS REFERENCE TO RELATED APPLICATIONS

This application is a continuation of application Ser. No. 12/850,045, entitled "INTERCONNECTION OF PERIPHERAL DEVICES ON DIFFERENT ELECTRONIC DEVICES", filed on Aug. 4, 2010, now issued U.S. Pat. No. 9,141,564, issued on Sep. 22, 2015, the entire contents are hereby incorporated by reference in its entirety.

TECHNICAL FIELD

The present invention relates generally to the use of peripheral devices and communication interfaces as a means of communication between electronic devices such as computers and, in particular, to bridging of peripheral devices via transport media that operates at various speeds and communication standards such as synchronous and asynchronous.

BACKGROUND OF THE INVENTION

A computer system is comprised of different components or devices that operate together to form the resultant system. Typical computer devices such as the central processing unit usually are supplied with the computer system initially whereas other devices can be installed into the computer system after the initial configuration of the system. The devices of the computer system are generally coupled together via interconnects which may be of several types, such as system and peripheral bus.

Networks are typically comprised of a variety of different electronic components or devices that are able to identify and communicate with each other by using an addressing and communication scheme that is known by each participant. The network allows computers to communicate with each other and share resources and information. Computer networks are made up of basic hardware building blocks to interconnect network nodes, such as Network Interface Cards, Bridges, Hubs, Switches, and Routers. A network card, network adapter or NIC (network interface card) is a piece of computer hardware designed to allow computers to communicate over a computer network. It provides physical access to a networking medium.

Device drivers are well known in the art. When a device is installed onto a computer by the user, a device driver has to be loaded to enable communication with the device. A device driver is software that is used to describe and control the device for the operating system. A virtual device driver is a specific type of device driver that, like a device driver for a physical existent device, has full access to the operating system kernel and is able to communicate directly to a physical port. In difference to device drivers for existent hardware a virtual device driver is loaded without a hardware device being detected by the system. A virtual device driver manipulates kernel mode code using existing hardware resources to emulate a device that is not present on the computer. A virtual driver is given more access than a traditional device driver because it is not restricted to talking to just one particular device.

Virtual device drivers are designed to handle hardware device contention between multiple processes and to translate or buffer data transfers from a virtual machine to hardware devices. A virtual machine is a self-contained operating environment that behaves as if it were a separate computer. When two or more processes attempt to access the same device, some method of contention management must be used. A virtual device driver allows each process to act as though it has exclusive access to the device.

For example, a virtual printer driver would provide the printing process with a virtual printer port, and characters written to the port would be written to a print spooler. The virtual device driver would then send the job to the printer when it becomes available. Another method would be to assign the physical device to only one process at a time, so that when a process attempts to access the device while it is in use, the virtual device driver does not pass the request to the actual hardware, and the process operates as though the hardware did not exist. Virtual device drivers also virtualize input/output to the device and for example a virtual network device driver translates this information into commands to be sent across a network to a hardware server. A technique that allows error free communication between devices that obligatory require exchange of protocol status information's faster than provided by the underlying network transport is not currently known in the art. However, such a technique would offer significant advantages over the prior art.

A method for bridging multiple network segments and exposing the multiple network segments as a single network to a higher level networking software on a bridging computing device as described in U.S. Pat. No. 7,089,335 is known in the art. However, if this method is used to connect devices that work with a time critical protocol and the transmission speed of the network segments fall under a certain value communication errors occur at the devices.

As disclosed in U.S. Pat. No. 6,968,307 a technique for creation and use of virtual device drivers on a serial bus is already known. Beside the creation of virtual device drivers also an extension of the peripheral bus even over a local area network (LAN) and/or a wide area network (WAN) is described. The method emulates the peripheral bus itself with all its typical features and characteristics. This method does not give an acceptable answer to the question how devices can communicate successful if the underlying network media itself does not meet the requirements of the peripheral bus in concern of speed and timing.

An extension of fast peripheral buses like the institute of electrical and electronics engineers (IEEE) 1394 "Firewire" bus over comparatively slow transport media such as wireless networks as disclosed by the IEEE 1394 Trade Association in December 2001 allows error free communication between endpoints of such an extended peripheral bus in terms of bus availability and clock time synchronization. However, a solution for devices that obligatory require the exchange of protocol information's at a speed that is higher than the wireless network is not included.

The IEEE 1394 Trade associations white paper "Networking IEEE 1394 Clusters via UWB over Coaxial Cable" discloses and covers many parts of communication between devices on a extended peripheral bus inclusive all timing requirements of video and audio devices. However, this disclosure is solely based on using an underlying network technology that is quite as fast as the peripheral bus itself. Slow, dropped out or unavailable networks are not covered by this disclosure.

Virtualization technologies from various manufacturers already allow the creation of additional virtual hardware resources such as network interface card, hard disk and computer system (Guest machine) on a physical existent computer system (Host machine). This technique emulates a machine with it's physical properties. By establishing interconnections between the physical devices of the host and the devices of the emulated guest devices of the guest can be attached to similar physical devices of the host.

However, devices on peripheral buses of the host machine such as nodes of a serial bus cannot be attached to nodes of the peripheral bus of the guest machine because the peripheral bus of the host is independent of the guest's bus. Even if possible, if the architecture of the guest's operating system fundamentally differs from the host's operating system the attachment of newly added devices on peripheral buses of the host to the guest's peripheral buses most likely fails because the device is announced by the operating system and not the machine.

In Digi International's AnywhereUSB Remote I/O Concentrator documentation another method is disclosed that is applicable for accessing physically existent USB devices on an external hardware device which is attached to a network cable from a remote computer that is also connected to a network. At the remote computer a service is used that connects to the external hardware by using the TCP/IP network transport protocol of the remote computer. Thru the network connection the service establishes a socket connection to the device. A hardware description information of each external USB connector is installed on the local computer. The local serial bus of the computer is extended with these new nodes and makes them part of the local serial bus. By design, this technique extends the local serial bus of the computer to the external device by emulating a wired connection over the network. The external device itself gets a part of the local serial bus. This approach requires that the external device with it's USB connectors can be reached by the network and provides information's about the installed connectors to the local service. If USB connectors are part of another computer's local serial bus or different types of connectors are used this method fails because the computer does not provide information's about the nodes installed on his local serial bus thru the network.

SUMMARY OF THE INVENTION

A peripheral device connected to a local electronic device which is connected to at least one communication network can communicate with a peripheral device attached to a remote electronic device as if the remote peripheral device was locally attached. Data designated for the remote peripheral device is received by a local virtual device object and transmitted to the remote electronic device via at least one of the electronic devices communication interfaces or peripheral devices. Data received by the remote electronic device's communication interface or peripheral device is written to the peripheral device at the remote electronic device by a virtual device object. For compensation of different transfer speeds or outages between the peripheral device and the communication interface or another peripheral device the virtual device provides the ability to utilize the virtual devices emulation driver that is attached to the virtual device object as an I/O buffer. As the invention provides a generic method for virtualization of a remote peripheral device it works independent from specific types of devices and Operating Systems. As the invention works with synchronous and asynchronous communication standards and does not require a specific network transport protocol it can be used with any available communication interface or peripheral device of the electronic device.

DETAILED DESCRIPTION OF THE INVENTION

Figure 1:
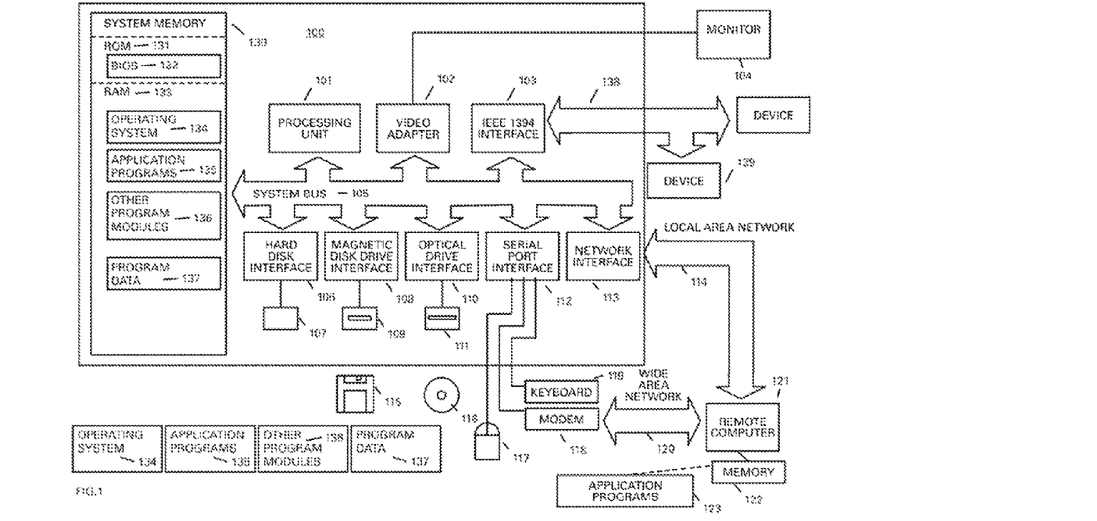
FIG. 1 is a block diagram of an exemplary operating environment.

The invention may be more vividly described with reference to FIGS. 1-5. FIG. 1 is a schematic diagram of a conventional digital electronic device that can be used to implement various aspects of the invention. The electronic device 100 includes a processing unit 101, a system memory 130 and a system bus 105 that couples various system components including the system memory to the processing unit. System bus may be any of several types of bus structures including a memory bus or memory controller, a peripheral bus, and a local bus using any of a variety of bus architectures. System memory includes a read only memory (ROM) 131 and a random access memory (RAM) 133.

A basic input/output system (BIOS) 132 containing the basic routines that help to transfer information between elements within the electronic device 100, such as during start-up, is stored in ROM 131. The electronic device 100 also includes a hard disk drive 107 for reading from and writing to a hard disk, an optical disk drive 111 for reading from or writing to a removable optical disk 116, such as a CD ROM or other optical media and a magnetic disk drive 109 for reading from or writing to a removable magnetic disk 115. Magnetic disk drive 109, Hard disk drive 107 and optical disk drive 111 are respectively connected to the system bus 105 by a magnetic disk drive interface 108, a hard disk drive interface 106 and an optical disk drive interface 111. The drives and their associated media provide nonvolatile storage of electronic devices readable instructions, data structures, program modules and other data for the electronic device 100.

Of course other types of media readable by electronic devices which can store data that is accessible by an electronic device such as flash memory cards, digital video disks, magnetic cassettes, random access memories (RAMs), read only memories (ROMs), and the like, may also be used in the exemplary environment. A number of program modules can be stored on the hard disk, magnetic disk 115, optical disk 116, ROM 131 or RAM 133, including an operating system 134, one or more application programs 135, other program modules 136, and program data 137.

A user can enter commands and information into the electronic device 100 through input or selection devices, such as a keyboard 119 and a pointing device 117. The pointing device 117 may comprise a mouse, touch pad, touch screen, voice control and activation or other similar devices. These and other input devices are often connected to the processing unit 101 through a serial port interface 112 that is coupled to the system bus, but may be connected by other interfaces, such as a parallel port or a universal serial bus (USB).

A monitor 104 or other type of display device is also connected to system bus 105 via an interface, such as a video adapter 102. In addition to the monitor, electronic devices typically include other peripheral output devices (not shown), such as speakers and microphones.

An additional serial port in the form of an IEEE 1394 interface 103 may also be provided. The IEEE 1394 interface 103 couples an IEEE 1394 compliant serial bus 138 to the system bus 105 or similar communication bus. The IEEE 1394 compliant serial bus 138, as known in the art, allows multiple devices 139 to communicate with the electronic device 100 and each other using high-speed serial channels.

The electronic device 100 can operate in a networked environment using logical connections to one or more remote electronical devices, such as a remote electronical device 121. A remote electronic device 121 typically includes at least some of the elements described above relative to the electronic device 100, although only a memory storage device 122 has been illustrated in FIG. 1. The logical connections depicted in FIG. 1 include a local area network (LAN) 114 and a wide area network (WAN) 120. Such networking environments are commonplace in offices, enterprise-wide computer networks, intranets and the Internet.

When used in a LAN networking environment, the electronic device 100 is connected to a local network 114 through a network interface or adapter 113. When used in a WAN networking environment, local electronic device 100 and remote electronic device 121 may both include a modem 118 or other means for establishing a communications over wide area network 120, such as the Internet. Modem 118, which may be internal or external, is connected to system bus 105 via serial port interface 112. In a networked environment, program modules depicted relative to the electronic device 100, or portions thereof, may be stored in the remote memory storage device. It will be appreciated that the network connections shown are exemplary and other means of establishing a communications link between the electronic devices can be used. The existence of any of various well-known protocols, such as TCPIIP, "ETHERNET", FTP, HTTP and the like, is presumed, and the system can be operated in a client-server configuration to permit retrievement of web pages from a web-based server. For example, in an embodiment of the present invention, the remote electronic device 121 is a server having stored thereon one or more files that may be accessed by the local electronic device 100. Procedures of the present invention described below can operate within the environment of the electronic device shown in FIG. 1.

Figure 2:
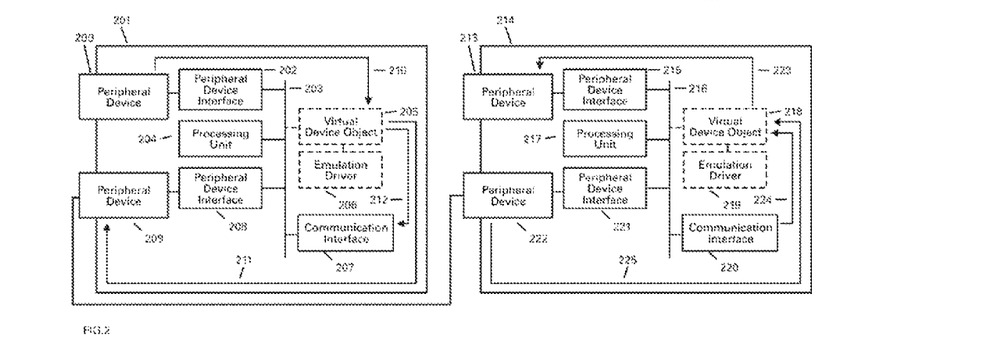
FIG. 2 is a block diagram of a system for transmission of data between electronic devices.

Although the present invention is generally applicable to an electronic device operating in accordance with the description shown above, the invention is applicable to any electronic device that is able to uniquely identify attached peripheral devices either by a reserved memory area or a unique node id like when using peripheral devices that are attached to a peripheral interface that uses direct memory access control methods. In FIG. 2, there is a system that may be used to implement the present invention. A peripheral device 200 may be connected to an electronic device 201.

The electronic device 201 comprises a peripheral device interface 202, which manages communications between the physical bus 203 and the peripheral device 200.

A user of the electronic device 201 has the option of creating a virtual device object 205 that, after completing the remaining steps represents an image of the remote peripheral device 215 plugged into the remote electronic device 214. At creation, the virtual device object loads an emulation driver 206 appropriate for a node of the peripheral bus of the selected local attached peripheral device 200.

The user may want to emulate more than one device. In this case, the user would repeat the process by creating a second virtual device object based on peripheral device properties of another locally attached device (not shown). The second virtual device object would then load a second emulation driver (not shown). Several virtual device objects 205 can be created and can exist at the same time. One benefit of the present invention is that it instantly allows a electronic device to emulate multiple remote peripheral devices at the same time.

Another benefit of the present invention is that it does not require that the remote device or the remote electronic device be plugged in or connected to create a virtual device object. A user mode application sends a request that tells the electronic device to create a virtual device object with certain peripheral device properties. The virtual device object loads an emulation driver that supports the target functionality of a node of the selected peripheral interface or bus. If the remote electronic device with the remote peripheral device attached to it is connected to the local electronic device the virtual device object is already present and is immediately capable of representing the complete functionality of the peripheral device of the remote electronic device.

Formerly, the electronic device would not be able to represent to its peripheral bus nodes functionality other than that of a physical device attached to the local peripheral bus. For this example, the device 200 is assumed to be a mass storage node attached to an IEEE 1394 bus. The electronic device 200 would have a device driver (USB mass storage device driver) that enables communication with the device 200. The user can create a virtual device object 205 that represents an additional member of the peripheral device class of the peripheral device 200 even though the device is not attached to the local electronic device.

At the local electronic device a virtual device object may be created by modifying the installation files of the peripheral device 200. When a IEEE 1394 bus node is detected, an additional virtual device entry is automatically created in the registry. The virtual device object 205 uses an emulation driver 206 for communication with the device 200.

In addition to being able to emulate multiple peripheral devices at one time and not requiring that a device be plugged in to emulate the device, another benefit of the present invention is that it allows "native" communication between physical existent and virtual devices across a peripheral bus. In the previous example, the peripheral device 200 can communicate using "native" language because it believes it is communicating with a node of the local peripheral bus instead of a remote electronic device. In the present invention no translations are necessary because the peripheral device 200 communicates directly with the virtual device object 205.

Figure 3:
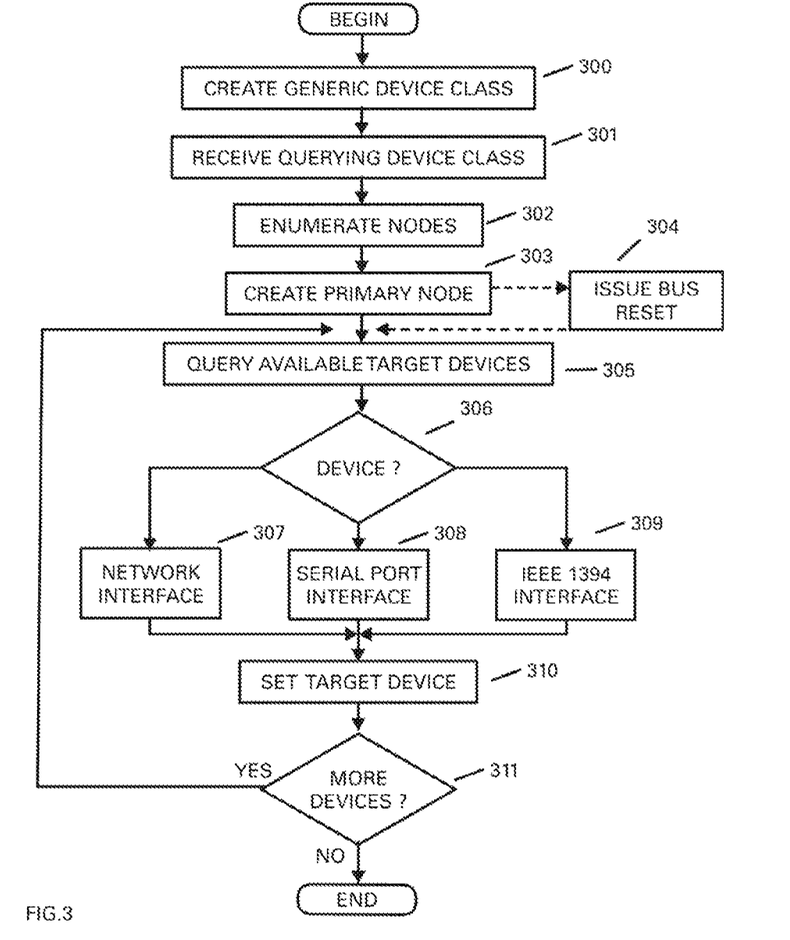
FIG. 3 is a flow chart illustrating a method of creating a virtual device in accordance with the present invention.

In FIG. 3, a method of creating a virtual device is shown. At step 300 a generic virtual device object is created by the operating system of the electronic device that may be initialized by the existent peripheral device itself that sends its peripheral device properties. After the querying device class is received 301 the peripheral devices attached to the peripheral interface or bus are enumerated 302. In case of a peripheral interface like the serial port interface enumeration is done by the operating system followed by the creation of a new primary node 303. In case of a node of a 1394 bus the driver enumerates the existent nodes by reading the nodes from the control status register and then adds a new node by assigning a node id and writing the appropriate information's to the CSR. In such case the driver issues a reset 304 of the peripheral bus to allow the nodes an enumeration of the new device. After setup of the primary node the second binding of the virtual device is set. This requires querying available target devices 305. this may either be done by the user or by using a predefined setup file that automatically selects from available communication interfaces 207 or peripheral devices that may be connected to a remote electronic device. After querying the available devices a device can be selected 306 from a list of available interfaces like for example a network interface 307 a serial port interface 308 or an IEEE 1394 interface and be set 310 as the primary target device. After the primary target device is selected additional secondary devices may be selected 311 to guarantee error free communication even if the primary device fails. This process can be repeated several times for each device the electronic device should use.

In case of using the method to emulate a node of a serial bus a bus reset can be forced after the device object's exposition. This bus reset causes all devices or nodes attached to the serial bus to enumerate each other. Any other node may now see the new node, the device chosen to emulate.

The method of creating a virtual device as shown in FIG. 3 can also be initialized by a request in the form of a data structure that is sent to the application program interface (API). The request to generate an additional node can be sent by an upper level driver that is already loaded for a IEEE 1394 device The request could also be sent by an application upon user request. Using a request to the 1394 bus driver software can pass a data structure that causes the bus driver itself to add a virtual device and to fill in the data structure required for the device. By setting an instance ID for the device the instance of the device can be identified.

For enumeration of the emulation driver a string may be passed to the driver that is used to generate the PnP ID's. To allow a virtual device on an IEEE 1394 bus to remain present despite a subsequent hardware or software reboot it may be necessary to pass a flag to the driver that keeps the devices state persistent. This will guarantee that the virtual device object will be reported as existent after a reboot. The electronic devices operating system believes the emulated device is present. In other words, the electronic devices operating system can then "see" the emulated device. This is a benefit because it allows any other node on the bus to communicate "natively" with the device rather than using an additional node that performs as a server/translator between the devices. Generally, virtual device objects and the respective drivers have the same access to the driver of the peripheral bus as would a physical device object and its respective driver.

Because there is no physical target device there are differences in behavior with a virtual device object because there is no physical target device. Normally the peripheral bus driver fills in the target node identifier and the appropriate packet size and transfer rate using information from the enumeration procedure with a particular device.

Due to the fact that there is no physical device the virtual device object has to provide all packet information because there is no target device node. For example, a read/write request will be intercepted and the virtual device object will fill in the address information for the request. The bus driver makes sure not to overwrite any fields. A request for allocation of a range exhibits different behavior if addressed to a virtual device object. All address allocations from an emulation driver will implicitly have the flag to broadcast access enabled if post notification on the address range is required. This is done to allow any external node to access the address range used by the emulation driver to simulate the device.

Figure 4:
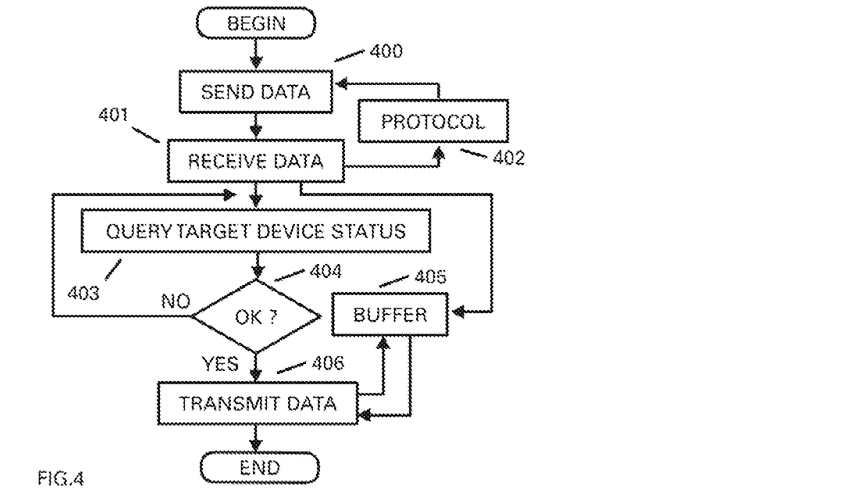
FIG. 4 is a flow chart illustrating a method of transmission of data from a peripheral device in accordance with the present invention.

In FIG. 4, a method of transmission of data from a peripheral device in accordance with the present invention is shown. Data 400 sent by the physical existent peripheral device to the virtual device object is received by the virtual device 401. As the virtual device object was generated based on descriptive information's of the sending device the exchange of necessary protocol status information's 402 may be provided by the virtual device object. Upon reception 401 of data from the peripheral device the virtual device object queries 403 the primary transport device and checks if the device is available for data transport. In case of a serial device this may be done by simply checking the status of the signal levels of the transmission and reception lines. Handshake lines, if any, may also be checked. As the virtual device objects purpose is to prevent from communication outages and failures it will always report a successful state to the sending peripheral device. While checking the target device status 404 the incoming payload data may be stored in a buffer 405. This buffer may either be located in the RAM of the electronic device or in any kind of mass storage device attached to the electronic device. The virtual device object may also use a combination of volatile memory like RAM and mass storage memory for example if the incoming payload data exceeds a certain amount mass storage memory is used instead of RAM. The virtual device object may also be configured to buffer the data according to the speed of the target device. The speed of the target device can be detected by measuring by comparing the time for filling up the initial buffer by the incoming data with the time the data is read by the target device. It is even possible to configure an algorithm that automatically sets the amount of buffer for the device based on the different speeds of the devices. Such algorithm may also automatically decide about the location for storage of buffered data, either in volatile or non volatile memory. As the virtual device object always reports the successful reception of data in a timely fashion to the sending device it prevents the sending device from reporting errors or warnings. If the virtual device object detects that the primary target device is finally not available, it restarts querying the target device status by querying the secondary target device. As the incoming payload data is buffered anyways this process does not lead to loss of any data. Upon a successful query of the target device the virtual device object transmits the data to the target. As data may arrive at the remote electronic device from various communication interfaces or peripheral device connections it is absolutely necessary to guarantee exact identification of the incoming data source by the receiving electronic device. This is provided by the virtual device object in various ways. The virtual device object can add its unique node id in the form of a identification string that may either be in plain text or, for binary data in the form of a binary pattern. Due to the fact that this data is never directly received by the peripheral device at the remote electronic device this does not lead to any reception errors at the remote peripheral device. If a communication interface in form of a network interface card is used unique identification of the source data can also be provided by adding identification information such as a number or a single flag to the data exchange protocol used by the communication interface. When using a network interface as the preferred communication media also a fixed communication port or a range of ports can be defined that allow identification by the receiving device.

Figure 5:
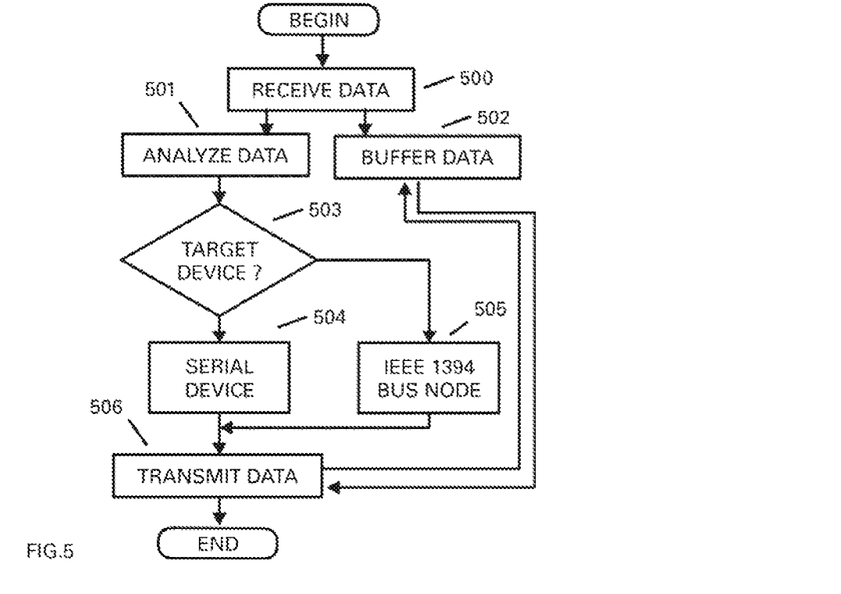
FIG. 5 is a flow chart illustrating a method of reception of data by a device in accordance with the present invention.

FIG. 5. shows a method of reception of data by a device in accordance with the present invention. As previously described data from a specific peripheral device may arrive at the receiving electronic device from multiple devices either communication interfaces or peripheral connections such as cables or WIFI connections. To guarantee exact identification of the incoming data the primary task of the virtual device object at the receiving electronic device is to analyze the incoming data. The architecture of the virtual device object used at the receiving device is similar to the architecture of the sending device. As described in FIG. 3 the virtual device object is based on a generic device object that is able to create peripheral device or bus bindings by querying existent peripheral device classes of the device. If the addressed peripheral device at the receiving electronic device is a member of the same peripheral device class as the peripheral device at the sending electronic device the virtual device object installed at the sending electronic device may be installed from a setup file generated by the initial device. As shown in FIG. 3 the virtual device object may create multiple bindings. The first step is to enumerate the existent device classes on the electronic device. At this device, the primary node is the target for the desired data transfer. The primary node may be automatically assigned by the virtual device object or manually selected from a list of available peripheral devices from the user. Because there is no need for creation of additional new bus nodes or new virtual peripheral devices a bus reset after enumeration of the existent nodes on the target bus is not necessary. As described in FIG. 3 it is necessary to select at least one communication interface or peripheral device at the virtual device object to inform the virtual device object about possible interfaces for incoming data. When installing the virtual device object on the target electronic device it is very useful to use the existent setup information of the sending device to guarantee that the unique node id transmit by the sender leads incoming data to the desired peripheral device. As data may arrive from various interfaces the virtual device objects primary task is to analyze the incoming data for the node id specified in the virtual device object. As this may take some time the virtual device object writes the incoming data to a buffer that may be built up in all variations as described in the previous chapters. If the virtual device object has finished the analysis of the data, it removes the identification data and transmits the payload data to the targeted device.

For most requests, the behavior is identical between virtual and physical devices. Although the invention has been described in relation to preferred embodiments, many variations, equivalents, modifications and other uses will become apparent to those skilled in the art. The scope of the present invention should not be limited to the specific disclosure but determined only by the appended claims.

The present invention is also applicable for electronic devices that have limited or no hardware abstraction capabilities.

Figure 6:
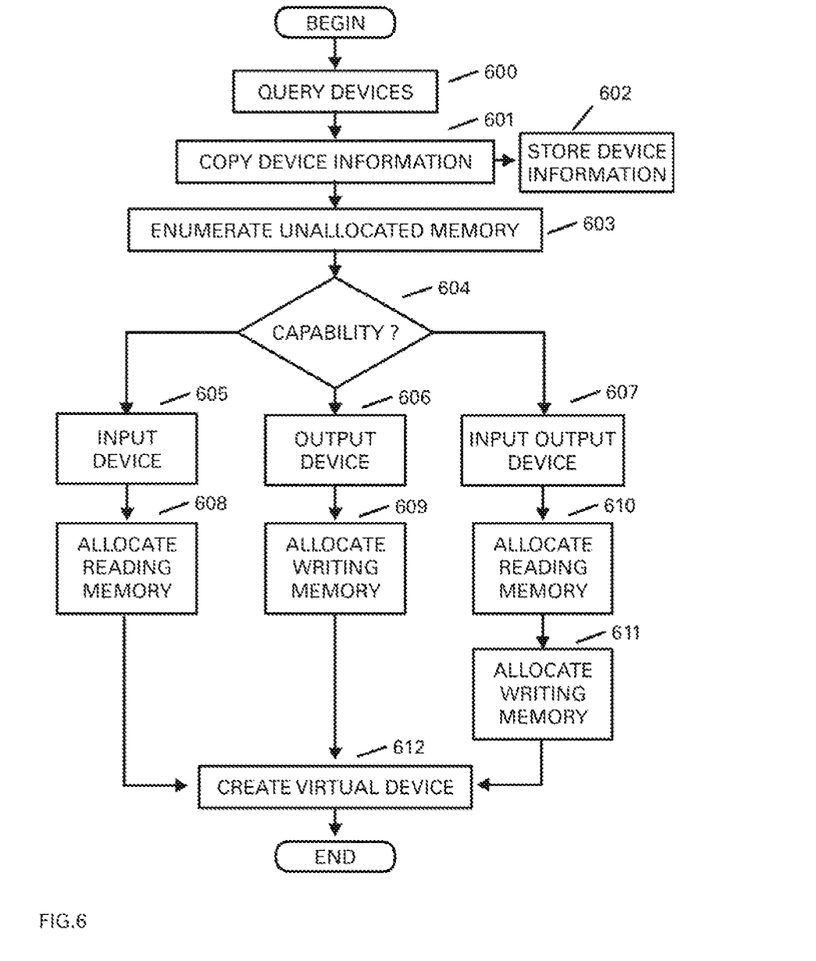
FIG. 6 is a flow chart illustrating a method of creating a virtual device if used on electronic devices that have limited or no hardware virtualization capabilities

In FIG. 6 a method of creating a virtual device in such an electronic device is shown. At step 600, the information about existing peripheral devices is queried from the electronic device. The devices main application program usually stores this information in a plain text file or a formatted file that, combined with the electronic devices or it's operation systems rule set for reading or writing information's represents a table. The information may be stored in the electronic devices system memory. Alternatively this information can be stored in an external storage media that may be accessible from the electronic devices system bus or a peripheral device interface. The information contains descriptive information's about the peripheral device, its capabilities like Input-Output-device or both and the memory areas allocated for the device. As such simple devices mostly do not have peripheral devices that allow viewing or direct input of information it may be necessary to transmit the devices application program to an external device that is capable to do so prior to making modifications. For transmission from and to the electronic device any available peripheral device interface that allows In- and Output may be used. If the electronic device provides remote access like from an internal web server or a communication protocol (e.g. Telnet) this may also be used to access the device. To create a virtual device information about a single existing peripheral device is copied 601 to either a internal or a external memory location. This can be done by user input or the electronic devices application program. The memory areas of the electronic device that are already allocated by existing peripheral devices are used to enumerate unallocated memory 603 for the virtual device. All peripheral device information copied in step 601 is saved 602 to allow subsequent configuration tasks. Depending on the capabilities 604 of the copied device information about allocated memory areas of the copied peripheral device is modified to point to unallocated memory areas followed by allocation of the newly defined memory areas for the virtual peripheral device. In case the copied peripheral device is an input device 605 a memory area for reading 608 is allocated. In case the copied device is an Output device 606 a memory area for writing 609 is allocated. If the copied device is an In- and Output device one memory area for reading 610 and one for writing 611 is allocated. By adding this information to the electronic devices peripheral device configuration information file the virtual device is created 612. As any attempt to read from this device would give no results and an attempt to write to this virtual electronic device would lead to an immediate buffer overflow caused by non existence of a physical device that picks up the data additional steps are required depending on the capabilities of the electronic device and/or it's Operating System.

Figure 7:
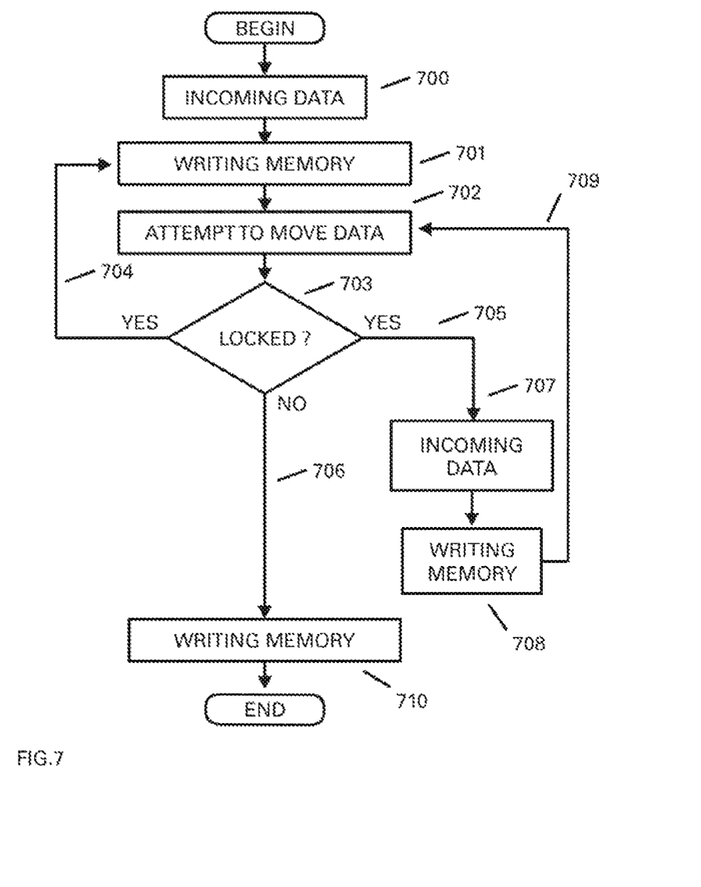
FIG. 7 is a flow chart illustrating a method of transmission of data from a virtual device if used on electronic devices that have limited or no hardware virtualization capabilities

In FIG. 7 a method of sending data by a virtual device is shown. To send incoming data 700 received by the virtual device out via the physical existent peripheral device data has to be written to the virtual devices memory area for writing 701. Incoming data at this memory location causes the virtual peripheral device to attempt to move the data 702 to the writing memory area of the physical existent device 710. In case the memory area of the physical existent device is locked 703 for example due to an active sending process of the electronic device the memory area of the virtual device for writing also changes to a locked state 704 to prevent from buffer overflows. Another possible variant for sending data is to create, as described above, a second virtual device that receives 707 the data sent by the first virtual device in case the memory area status of the physical existent device for writing is locked 705. The memory area for writing 708 of this second virtual device may be located in the electronic device or attached to it as a peripheral storage device. In distinction to the procedure for locking 704 the memory area of the first virtual device if only a physical existent target device is defined the status of the first virtual devices memory for writing changes to unlocked as soon as the second virtual device is selected. The second virtual device also attempts to move 709 the data to the writing memory of the physical existent device. The ability to subsequently use multiple devices for transmission of data in combination with the buffering scheme also allows packaging of small snippets of data to a single data packet if used in conjunction with a packet oriented network protocol that provides information's about available sizes of transfer units. In such case the second virtual device retains all incoming data until the amount equals the size of the specified transfer unit and then writes the data to the memory area of the physical existent device for writing. As the virtual device has a memory area allocated for writing the size of this memory area may also be used to define the packet size even if the physical existent device again divides the incoming data into smaller packets or merges them to form larger packets.

As the first virtual device is not connected to a physical accessible interface reading data from a physical existent peripheral device requires additional steps. Incoming data at a physical existent interface usually is unassigned and needs to be picked up by the application program of the electronic device for further processing. To read data from the physical existent interface the virtual device initially locks the input memory area of the physical existent device or performs permanent read requests to the input memory area of the physical existent device. This causes the physical existent devices input memory area to change its status to be locked for reading by parts of the electronic devices application program or peripheral devices of the electronic device other than the virtual device. On arrival of data at a physical existent interface the virtual device copies the data to the input memory area of the virtual device and clears the input memory area of the physical existent device to allow reception of further data. If more than one virtual device is defined the data is cleared from the input memory area of the physical existent device after it has been written to the last virtual device. As the input memory area of the physical existent device stays locked and is not accessible by the application program or other devices than the virtual devices the descriptive information about the physical existent peripheral device may be changed to point to the input and/or output memory area of a virtual device so no modifications of the electronic devices initial application program are needed.

As the present invention allows transmission of data from multiple virtual devices via one physical existent peripheral device it is also possible to add additional information for each virtual device to the data being written to the memory area for writing of the physical peripheral device. If used in a bus system were the node identifies itself by a unique node identification each virtual device can add its own node identification to the data being written. The node identification may be taken from the descriptive information of the virtual device or be set by the application program of the electronic device. As a result, a single electronic device with a single peripheral communication interface can appear as multiple devices on a bus system.

The invention can also be used to create multiple virtual devices in manufacturer specific bus topologies (like CAN, EIB, MAP) that assign a unique node id to each client. Such "real time" buses work at a fixed speed where data packets are transported in slots and identify themselves by a node id that is checked by each node of the bus. As incoming data on a single physical interface may be received by multiple virtual devices and each virtual device can have its own node id it is possible to address multiple bus clients in one electronic device. By adding a specific node id to unassigned data arriving at the memory area for writing of the virtual device it is possible to transmit data from a specific bus node to other nodes on the bus. As reception of data on the physical existent interface of the electronic device leads to reception on all virtual devices even such virtual devices can be directly addressed as the virtual devices that do not have the node id addressed simply discharge the data.

If the descriptive information about the physical existent device is changed to point to the memory area assigned to a virtual device all traffic targeted to the physical device by the electronic devices application program can be simply redirected to another physical device as the virtual device may be connected to another physical existent peripheral or communication device. Such redirection can even be achieved if the descriptive information of the physical existent device cannot be modified. All data sent out by the electronic device may be received by another device that leads this data to its own virtual devices. As these virtual devices can be bound to various physical existent devices redirection can be achieved even if not possible in the sending device.

The present invention allows the use of multiple physical communication or peripheral devices for transmission of data from one sender. All of the electronic devices communication or peripheral devices may simultaneously be available and able to transfer data to the desired target. The route between the local and the remote device varies dependent on the selected peripheral or communication device and the target. As the route and the transmission time for each target may dynamically change due to traffic and intermediate devices on the route in addition to the successive access of the defined devices depending on their availability various routing protocol methods can be used for the selection of a preferred device for specific targets.

To select a preferred communication interface or peripheral device for data transfer to a specific target the electronic device itself may maintain a list of destinations and their routes by periodically distributing and receiving routing tables throughout the network. The electronic device may also find routes on demand by flooding the network with route request packets. The route may also be found on demand by following present flows wherein the electronic device may unicast consecutively when forwarding data while promoting a new link. These known routing protocol methods may also be combined by initially establishing the routing with some already prospected routes followed by serving the demand from additionally activated nodes through flooding the network with route request packets. These known routing protocol methods are only applicable for communication tasks were a single network protocol is used on all targeted nodes. As the present invention supports the usage of multiple communication and peripheral interfaces that usually work with different communication protocols and transport media adjusted routing protocol methods have to be used.

The virtual peripheral device in conjunction with the associated physical existent peripheral and communication devices builds up a functional unit in the electronic device. The initial structure of this unit already contains a static routing protocol method were the selection of the preferred communication or peripheral device depends on its order and its availability. For communication with a remote node the unit always selects the first device. Only if this device is not available the second device is selected. For flexibilization of this static behavior the unit may add metric information for each selectable peripheral or communication interface. Depending on the capabilities of the electronic device this information can be stored together with the descriptive information of the unit or in a separate list, a unit specific routing table that is assigned to the unit. If a metric is available for the devices selection of the preferred device is done by comparison of the available metrics. If no additional routing algorithms are used the metric value may be defined by the order and the availability of the devices. If a device becomes unavailable, its metric is increased by the unit. This results in a change of the order of the preferred devices. Unit specific routing information may be distributed to and received by other available nodes. As the distributed routing information contains information about the sending device, the available communication and peripheral interfaces and their respective metric values the information can be used by other nodes for communication with peripheral devices at the electronic device that distributed the information. If used in conjunction with communication interfaces that support a packet oriented network protocol the units routing information may be distributed by using a specific port number. If used with peripheral or communication interfaces that do not support such distinction methods, the unit specific routing information may also be exchanged by sending it together with the transmitted payload data. This, of course requires a known synchronization indicator for begin and end of routing information on all participating nodes. Alternatively the routing information for the unit can be transmitted by a communication interface of the electronic device that supports a packet oriented network protocol but is not a member of the unit. To define or adjust metrics for the peripheral or communication interfaces of the unit additional methods can be used. For communication interfaces that support a packet oriented network protocol information about number of hops, speed of the path, latency, path reliability, path bandwidth, load and MTU can be taken into account whereas with peripheral devices that just use simple point to point communication only speed and latency information may be available for definition of the metric value.

What is claimed is:

1. A method, comprising:
   creating a generic virtual device object via a processor of an electronic device, the generic virtual device object representing an image of the peripheral device attached to the electronic device and comprising properties of the peripheral device created by a user;
   assigning the generic virtual device object to a device class created by the user associated with the peripheral device;
   binding the generic virtual device object to at least one communication interface of the electronic device;
   installing the generic virtual device object on a remote electronic device using existent setup information of the electronic device;
   receiving data at the electronic device from a remote peripheral device attached to the remote electronic device;
   generating a setup file via the electronic device responsive to determining the device class of the remote peripheral device attached to the remote electronic device is a same one as the device class of the peripheral device attached to the electronic device;
   installing a remote virtual device object at the remote peripheral device via the setup file to provide the electronic device with access to remotely emulate the remote peripheral device; and
   emulating the remote peripheral device from the electronic device via an emulation driver loaded by the remote virtual device object;
   wherein multiple remote virtual device objects are created for respective emulation drivers; and
   wherein multiple remote peripheral devices are emulated simultaneously.

2. The method of claim 1, wherein data received by the generic virtual device object from sources other than its binded communication interface is redirected to at least one assigned communication interface.

3. The method of claim 1, wherein data received by the communication interface that is bound to the generic virtual device object is redirected to the generic virtual device object.

4. The method of claim 2, further comprising:
   creating an intermediate buffer between the generic virtual device object and its communication interface; and
   sending data designated for the communication interface to the buffer and sending data from the buffer to the communication interface.

5. The method of claim 3, further comprising:
   creating an intermediate buffer between the communication interface and the generic virtual device object; and
   sending data designated for the generic virtual device object to the buffer and sending data from the buffer to the generic virtual device object.

6. The method of claim 2, further comprising:
   determining the availability of any communication interface; and
   performing at least one of redirecting and sending data to the first available communication interface.

7. The method of claim 1, wherein information used to bind the generic virtual device object to the communication interface is taken from a setup file.

8. The method of claim 1, wherein information used to bind the generic virtual device object to the communication interface is inputted by the user.

9. The method of claim 1, wherein creation of the generic virtual device object is initialized by an existent peripheral device of the electronic device.

10. The method of claim 1, wherein creation of the generic virtual device object is initialized by a request in the form of a data structure.

11. The method of claim 1, wherein the assignment of the device class is determined by a querying peripheral device.

12. The method of claim 1, wherein a parameter for assignment of the device class is inputted by the user.

13. The method of claim 1, further comprising assigning properties of the generic virtual device object by at least one accessory parameter.

14. The method of claim 1, further comprising enumerating existent device nodes detected and device classes currently operating on the electronic device.

15. The method of claim 1, further comprising assigning a primary node via the virtual device object, wherein the primary node is an intended target recipient of a data transfer.

16. The method of claim 1, wherein the device class of the generic virtual device object is different from any communication interface device class previously bound to the at least one communication interface of the electronic device.

17. The method of claim 1, wherein the determining of the device class of the remote peripheral device attached to the remote electronic device is the same as the device class of the peripheral device attached to the electronic device occurs via the data received via the generic virtual device object.

18. The method of claim 1, further comprising transmitting the setup file from the electronic device to the remote electronic device.

19. A non-transitory computer readable medium comprising instructions that, when executed by a processor, cause the processor to perform:
   creating a generic virtual device object representing an image of a peripheral device attached to an electronic device and comprising properties of the peripheral device created by a user;
   assigning the generic virtual device object to a device class created by the user associated with the peripheral device;
   binding the generic virtual device object to at least one communication interface of the electronic device;
   installing the generic virtual device object on a remote electronic device using existent setup information of the electronic device;
   receiving data at the electronic device from a remote peripheral device attached to the remote electronic device;
   generating a setup file via the electronic device responsive to determining the device class of the remote peripheral device attached to the remote electronic device is a same one as the device class of the peripheral device attached to the electronic device;

installing a remote virtual device object at the remote peripheral device via the setup file to provide the electronic device with access to remotely emulate the remote peripheral device; and emulating the remote peripheral device from the electronic device via an emulation driver loaded by the remote virtual device object;

wherein multiple remote virtual device objects are created for respective emulation drivers; and wherein multiple remote peripheral devices are emulated simultaneously.

20. A system, comprising:

a remote electronic device;

a remote peripheral device a peripheral device; and an electronic device including a processor configured to:
- create a generic virtual device object that represents an image of the peripheral device and comprising properties of the peripheral device created by a user;
- wherein the generic virtual device object is assigned to a device class created by the user associated with the peripheral device;
- bind the generic virtual device object to at least one communication interface of the electronic device;
- install the generic virtual device object on the remote electronic device using existent setup information of the electronic device;
- receive data at the electronic device from the remote peripheral device communicably coupled to the remote electronic device;
- generate a setup file via the electronic device responsive to a determination that the device class of the remote peripheral device attached to the remote electronic device is a same one as the device class of the peripheral device attached to the electronic device;
- install a remote virtual device object at the remote peripheral device via the setup file to provide the electronic device with access to remotely emulate the remote peripheral device; and
- emulate the remote peripheral device from the electronic device via an emulation driver loaded by the remote virtual device object;
- wherein multiple remote virtual device objects are created for respective emulation drivers; and
- wherein multiple remote peripheral devices are emulated simultaneously.

* * * * *